Nov. 23, 1954          C. ZELNICK          2,694,861

MACHINIST'S GAUGE

Filed May 3, 1952          2 Sheets-Sheet 1

INVENTOR

Charles Zelnick.

BY Fearman & Fearman

ATTORNEY

INVENTOR
Charles Zelnick.

United States Patent Office 2,694,861
Patented Nov. 23, 1954

2,694,861

MACHINIST'S GAUGE

Charles Zelnick, Saginaw, Mich., assignor to The Lufkin Rule Company, Saginaw, Mich.

Application May 3, 1952, Serial No. 285,857

9 Claims. (Cl. 33—162)

This invention relates to a machinist's gauge of the type used in shop practice for use in setting cutting tools on planers, shapers and similar machines, and more particularly to a gauge which can be used with continual gauge blocks, sine bars, indicators etc., and which includes a positive locking means to clamp the gauge head in set position on the slotted hypothenuse surface of the gauge block.

One of the prime objects of the invention is to design a sturdy and durable machinist's gauge which includes a gauge head which will not slip when jarred or roughly handled, thus insuring accurate measurement under the most difficult conditions.

A further object of the invention is to provide the clamp screw of a conventional machinist's gauge with a rockable wedge member which tilts and locks when the screw is turned down to wedge the member in the head of the T-slot provided in the hypothenuse surface of gauge blocks of this type.

Another object of the invention is to provide a rockable wedge plate mounted longitudinally off-center on the end of the clamp screw, said wedge plate tilting when the screw is actuated to positively and sharply engage the upper and lower surface of the T-slot and lock the wedge plate in set position.

Another object of the invention is to provide yieldable means on the clamp screw to prevent binding after the gauge head has been approximately set and it is desired to minutely adjust it to exact position.

A still further object of the invention is to design a machinist's gauge of the type described which can be easily and economically manufactured and assembled, and which can be readily disassembled when necessary for inspection, repair or replacement of broken or worn parts.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

Figure 1:
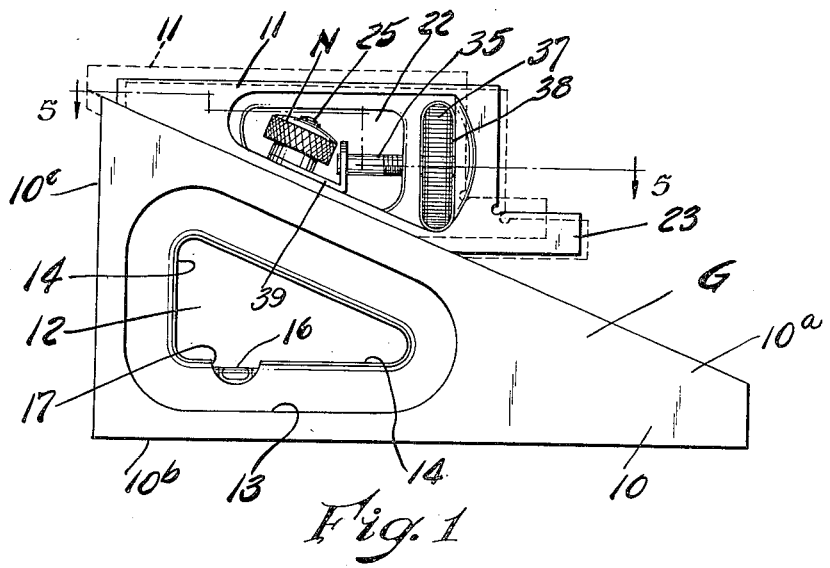
Fig. 1 is a side elevational view of my improved gauge, the broken lines indicating adjusted positions of the head.
Figure 2:
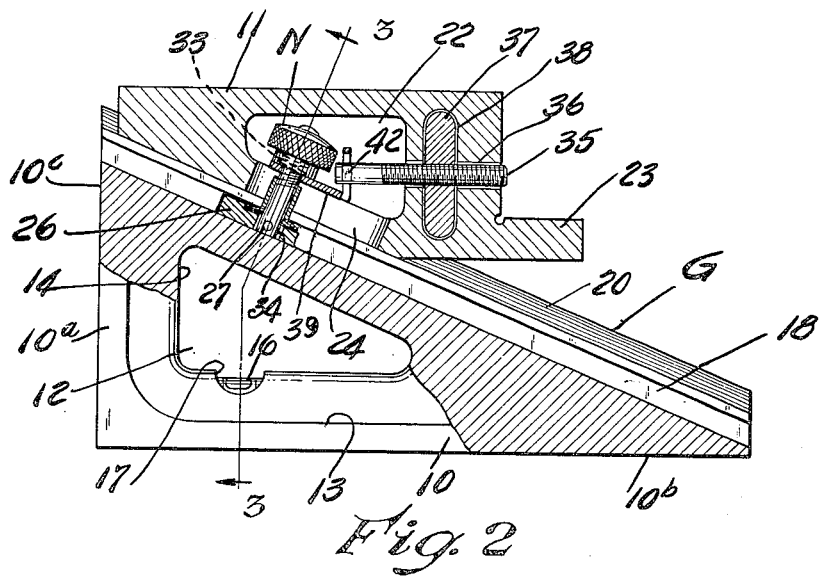
Fig. 2 is a vertical, part sectional, side elevational view of the device.
Figure 3:
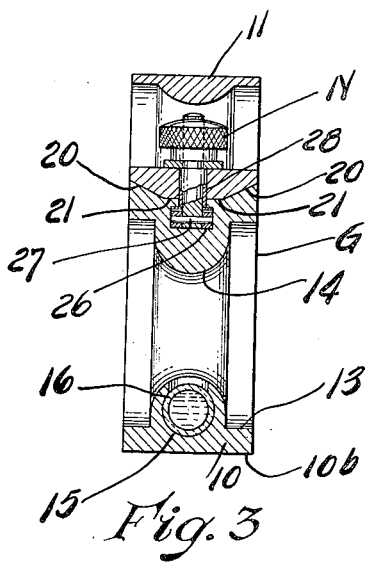
Fig. 3 is a transverse, sectional view taken on the line 3—3 of Fig. 2 and looking in the direction of the arrows.

Referring now more particularly to the accompanying drawings in which I have shown the preferred embodiment of my invention, a letter G generally indicates my gauge which includes a right angle, triangular base block 10 of conventional design, and an oppositely disposed, substantially triangular gauge head 11 mounted for sliding movement thereon. A triangular-shaped opening 12 is provided in the base block 10, the marginal side walls 10a being shouldered as at 13 and defining a central, continuous web 14 surrounding said opening.

A horizontally disposed passage 15 is provided in the lower portion of the base block 10, and a spirit level 16 is positioned therein to indicate the true horizontal position of the bottom surface 10b, or the true vertical position of the end surface 10c as desired, an opening 17 being provided in the web 14 and communicating with the passage 15 so that the level may be easily read.

An inverted T-slot 18 is machined in the hypothenuse face 19 of the base block 10 and the face is formed with transversely inclined side portions 20 which are pitched toward the slot 18, and terminate in flat sections 21 defining the side walls opening into the T-shaped slot 18.

The inclined face of the gauge head 11 is shaped to fit in facial contact with and slide on the surfaces 20 and 21, said head being formed with a triangular opening 22, and a horizontally disposed step portion 23 as usual.

A clamp screw assembly C (see Fig. 4 of the drawings), extends through an elongated slot 24 provided in the lower inclined face of the gauge head 11, and includes a clamp screw 25 having a wedge member or plate 26 rockably mounted, longitudinally off-center on the lower end thereof by means of the pin 27, the wedge plate 26 being normally slidable in the head portion of the T-slot 18, and a sleeve 28 is provided on the clamp screw to minimize wear.

Figure 4:
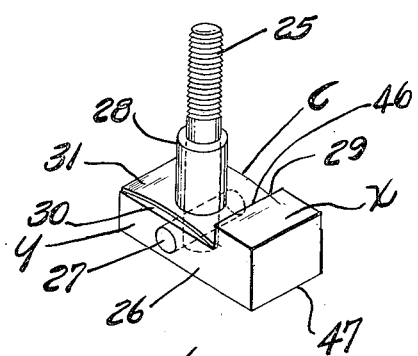
Fig. 4 is a perspective view of the clamping screw assembly.
Figure 5:
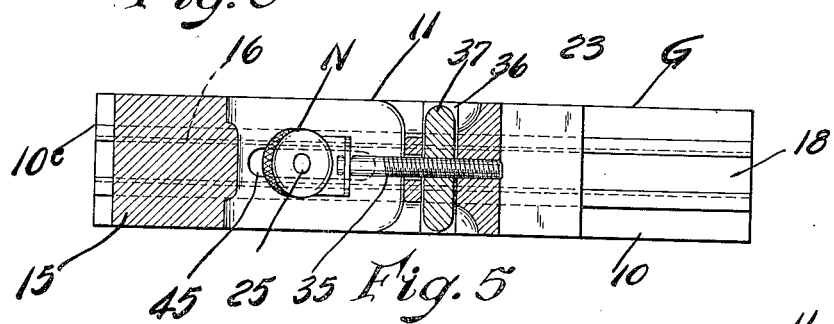
Fig. 5 is a sectional, plan view of the gauge taken along the line 5—5 of Fig. 1 and looking in the direction of the arrows.

The upper face of the wedge plate 26 is shouldered at a point intermediate its length as at 29 to provide a flat surface 30, and a flexible bowed leaf spring 31 is mounted on the clamp screw 25 and bears on the surface 30 to provide flexibility and prevent binding during longitudinal adjustment of the gauge head, one edge of the spring 31 bearing against the shoulder 29 as clearly shown in Fig. 4 of the drawings.

A knurled actuating nut N is threaded on the upper end of the clamp screw 25 and is counterbored as at 32 to accommodate a spring 33, said nut being readily accessible through the triangular opening 22 for manipulation as usual.

I wish to direct particular attention to the fact that the wedge plate 26 is rockably mounted on the screw 25, the opening 34 being of larger diameter than the pin 27 to permit such rocking movement.

Figure 6:
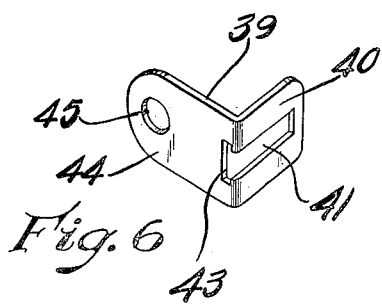
Fig. 6 is a perspective, plan view of the slide plate member turned on edge and looking toward its bottom face, to illustrate the slot therein.
Figure 7:
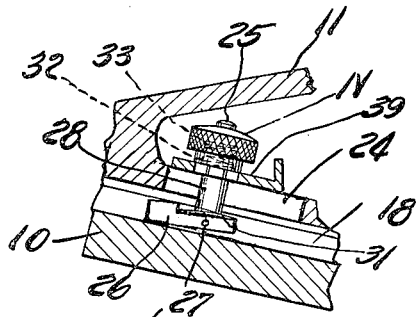
Fig. 7 is an enlarged, fragmentary, sectional, side elevational view illustrating the wedge plate in tilted, locked position.

In setting the gauge for precision measurements, the head 11 is usually pushed or lightly tapped into position, making minute adjustments somewhat difficult, and I therefore provide a manually operable adjusting screw 35 which is mounted for longitudinal travel in a threaded passage 36 provided in the gauge head. A knurled adjusting nut 37 is mounted on said screw within an opening 38 provided in said head, this nut being of sufficient diameter to extend beyond the side walls of the head for easy engagement by the user. A substantially L-shaped slide plate 39 (see Fig. 6 of the drawings), is slidably mounted in the opening 22, the one leg 40 being slotted as at 41 to accommodate the grooved section 42 of the screw 35, the one end of the slot being enlarged as at 43 to facilitate assembly of the screw, and the leg 44 of said plate is provided with an opening 45 as usual to accommodate the clamping screw 25, and it will be obvious that this nut 35 can be manipulated to accurately set the head as desired, the frictional resistance of the springs 31 and 33 serving to normally hold the head in approximate setting.

In practice, the gauge head 11 is set quickly by pushing or tapping the head to roughly approximate position, and the actuating nut N is lightly turned down to hold it in position. Then the adjusting nut 37 is actuated to minutely adjust the head longitudinally in either direction to final position, the springs 31 and spring 33 being sufficiently flexible to prevent binding during the minute adjustment. The actuating nut N is then turned tight to tilt the plate, the upper edge 46 and the lower edge 47 of said plate sharply engaging the upper and lower walls of the slot to firmly wedge the plate therein and lock the gauge head 11 in final position, after which the measurement is taken.

While in the instant application I have shown the wedge plate 26 with its one section X of greater height than the remaining section Y of the plate, it will be obvious that this section X can be proportionately of less height, so that the one edge 48 of the shoulder section Y and the lower rear edge 47 form the wall-engaging points when the plate is tilted.

From the foregoing, it will be seen that I have provided a positive and accurate locking means for the gauge head which will not slip and which thereby insures accurate measurement at all times.

What I claim is:

1. In a machinist's gauge, the combination comprising a base block having a hypothenuse surface and a T-slot formed in said surface, a gauge head slidably mounted on said hypothenuse surface, a clamping screw for said gauge head extending into said T-slot, and a wedge member having a shoulder provided thereon adjacent one end thereof normally slidable in said T-slot and rockably connected to said clamping screw to tilt and wedgingly engage the walls thereof when said clamping screw is tightened to wedge the edge of said shoulder and the opposite marginal edge of said end of the member in said slot.

2. The combination defined in claim 1 in which said shoulder is provided on the upper face of said wedge member interjacent its ends, and a leaf spring mounted on said clamp screw in engagement with the upper face of the wedge member with its one end bearing against said shoulder.

3. In a clamp screw for machinist's gauges, a threaded stem, an actuating nut provided on said stem, and a wedging member rockably mounted on the lower end of said stem, said member having flat upper and lower surfaces broken by a projecting shouldered portion adjacent one of its ends.

4. In a clamp screw for clamping the gauge head on the hypothenuse surface of a machinist's gauge, a threaded stem, an actuating nut for said stem, a wedge plate rockably connected off-center to the lower end of said stem, a shoulder provided on the upper face of said plate at a point intermediate its length, and a leaf spring mounted on said stem over said plate with its one end bearing against said shoulder.

5. The combination defined in claim 3 in which a bowed leaf spring is mounted on the clamping screw in contact with the member.

6. In a machinist's gauge, the combination comprising a base block having an inclined surface and an inverted T-slot formed therein, a gauge head mounted on said inclined surface, a clamp screw for said gauge head extending into said block, a wedge member rockably connected off-center to said clamping screw and normally slidable in said T-slot, a bowed leaf spring mounted on said clamp screw and bearing on the upper surface of said wedge member, said wedge member being tiltable in a substantially vertical plane when said clamping screw is turned tight to wedge and lock said gauge head in set position.

7. In a gauge for machinists, a base block including a surface having a slot therein, said slot including a portion of restricted width communicating with said surface, and an undercut portion of enlarged width communicating with said portion of restricted width, a head member slidably mounted on said surface, a clamping screw for said head member extending through the restricted portion of said slot into the enlarged portion thereof, and a wedge member having a shoulder provided thereon adjacent one end thereof rockably connected to the inner end of said clamping screw to tilt and wedgingly engage opposite walls of the undercut portion of said slot when said clamping screw is tightened to lock the wedging member in said slot.

8. In a machinist's gauge, the combination comprising a base block having an inclined surface, an inverted T-slot formed in said inclined surface, said T-slot having inner and outer walls, a gauge head mounted on said inclined surface and slidable longitudinally thereon, an axially movable clamp screw carried by said gauge head and extending into said T-slot, a wedge plate disposed in said T-slot and normally slidable therein, means rockably connecting said clamp screw to said wedge plate so as to permit said wedge plate to rock relatively to said clamp screw when said clamp screw is moved axially, axial movement of said clamp screw in one direction rocking said wedge plate into wedging relation with the inner and outer walls of said T-slot, and spring means mounted on said wedge plate and being disposed between said wedge plate and said outer wall, said spring means being operative to urge said wedge plate out of wedging relation when said clamp screw is moved in the opposite direction.

9. In a machinist's gauge, the combination comprising a base block having an inclined surface with an inverted T-slot formed therein, a gauge head mounted on said surface and slidable longitudinally thereon, a clamp screw in said gauge head and movable therein only in an axial direction extending through said gauge head into said T-slot, a wedge plate normally slidable in said T-slot and rockably connected to said clamp screw to tilt in substantially the axial plane thereof, said wedge plate being balanced to tilt to bring the same into wedged engagement with opposite walls of the undercut head portion of said T-slot when said clamp screw is tightened to lock the gauge head in set position, and an apertured leaf spring, said clamp screw extending through said aperture, said leaf spring being disposed between said wedge plate and the outer marginal wall of the undercut head portion of said slot in position to be compressed when said clamp screw is tightened and to urge said plate out of wedged engagement when the clamp screw is backed off.

References Cited in the file of this patent

UNITED STATES PATENTS

| Number | Name | Date |
|---|---|---|
| 2,219,180 | Fichter | Oct. 22, 1940 |
| 2,242,116 | Donaway | May 13, 1941 |
| 2,552,738 | Renner | May 15, 1951 |